United States Patent
Brooks et al.

(10) Patent No.: US 10,457,281 B2
(45) Date of Patent: Oct. 29, 2019

(54) VEHICLE COMMUNICATION SYSTEM

(71) Applicant: General Electric Company, Schenectady, NY (US)

(72) Inventors: James D. Brooks, Schenectady, NY (US); Jeffery Armstrong, West Melbourne, FL (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 283 days.

(21) Appl. No.: 15/412,692

(22) Filed: Jan. 23, 2017

(65) Prior Publication Data

US 2018/0210439 A1 Jul. 26, 2018

(51) Int. Cl.
  *B60W 30/16* (2012.01)
  *B61L 3/12* (2006.01)
  *B61C 17/12* (2006.01)

(52) U.S. Cl.
  CPC ............. *B60W 30/16* (2013.01); *B61C 17/12* (2013.01); *B61L 3/127* (2013.01)

(58) Field of Classification Search
  CPC combination set(s) only.
  See application file for complete search history.

(56) References Cited

U.S. PATENT DOCUMENTS 6,505,103 B1  1/2003  Howell et al.
6,822,573 B2  11/2004 Basir
(Continued)

FOREIGN PATENT DOCUMENTS

CN  1784701  6/2006
CN  1910593  2/2007
(Continued)

OTHER PUBLICATIONS

Gamst et al, Hazrd Survey of Remote Control Locomotive Operations on the General System of Railroads in the United States, Brotherhood of Locomotive Engineers and Trainmen Division of the Rail Conference of the International Brotherhood of Teamsters, pp. xxvi + 217, May 23, 2005.

(Continued)

*Primary Examiner* — Redhwan K Mawari
(74) *Attorney, Agent, or Firm* — Christopher R. Carroll; The Small Patent Law Group LLC

(57) ABSTRACT

A system includes one or more processors configured to communicatively link a first operator control unit (OCU) disposed off-board a vehicle system with a vehicle control system (VCS) disposed onboard the vehicle system. The vehicle system is formed from first and second vehicles. The VCS is configured to remotely control movement of the second vehicle from the first vehicle, wherein the one or more processors configured to receive a control signal communicated from the first OCU to a communication device that is onboard the first vehicle. The control signal dictates a change in movement operational setting of the second vehicle. The one or more processors configured to direct the communication device to communicate the control signal from the first vehicle to the second vehicle via the VCS, wherein movement of the second vehicle is automatically changed responsive to communicating the control signal from the first vehicle to the second vehicle.

22 Claims, 7 Drawing Sheets

(56) References Cited

U.S. PATENT DOCUMENTS

| | | |
|---|---|---|
| 6,927,694 B1 | 8/2005 | Smith |
| 6,946,966 B2 | 9/2005 | Koenig |
| 7,484,169 B2 | 1/2009 | Hrebek et al. |
| 7,715,956 B2 | 5/2010 | Bryant |
| 8,190,311 B2 | 5/2012 | Smith |
| 8,589,001 B2 | 11/2013 | Siddappa et al. |
| 8,952,819 B2 | 2/2015 | Nemat-Nasser |
| 9,033,285 B2 | 5/2015 | Iden et al. |
| 9,365,222 B2 | 6/2016 | Hawthorne et al. |
| 2003/0213875 A1* | 11/2003 | Hess, Jr. .............. B61C 17/12 246/167 R |
| 2004/0193334 A1* | 9/2004 | Carlsson ............ G05D 1/0022 701/9 |
| 2005/0024212 A1 | 2/2005 | Hultzsch |
| 2010/0130124 A1 | 5/2010 | Teeter et al. |
| 2010/0222687 A1 | 9/2010 | Thijs |
| 2011/0267184 A1* | 11/2011 | Lee ..................... B60Q 9/005 340/435 |
| 2013/0261842 A1* | 10/2013 | Cooper .............. B61L 15/0081 701/1 |
| 2014/0365098 A1* | 12/2014 | Lawry .................. B61C 15/14 701/84 |
| 2015/0349917 A1* | 12/2015 | Skaaksrud .......... G06Q 10/0833 370/328 |
| 2015/0375764 A1* | 12/2015 | Rajendran .......... B61L 15/0027 701/2 |
| 2016/0009300 A1* | 1/2016 | Cooper ................ B61L 3/121 701/20 |
| 2016/0267795 A1* | 9/2016 | Miyazawa ............ G08G 1/22 |
| 2016/0307054 A1* | 10/2016 | Takemura .......... G06K 9/00791 |
| 2017/0090473 A1* | 3/2017 | Cooper ................ G05D 1/0027 |
| 2017/0163474 A1* | 6/2017 | Schoonmaker ..... H04L 41/0659 |

FOREIGN PATENT DOCUMENTS

| | | |
|---|---|---|
| CN | 102902874 | 1/2013 |
| CN | 203753260 U * | 8/2014 |
| CN | 104584084 | 4/2015 |
| CN | 104973054 | 10/2015 |
| DE | 3826943 | 2/1990 |
| GB | 2465439 A | 5/2010 |
| JP | 2008223879 | 3/2010 |
| KR | 2015007536 | 1/2015 |
| WO | 2015066445 | 5/2015 |
| WO | 2015175435 | 11/2015 |
| WO | 2016044678 | 3/2016 |

OTHER PUBLICATIONS

"Driver Drowsiness Detection—The Technology Race in the Car to Keep the Driver Awake and Focused," Safety Technology Overview 2016, accessed Jan. 23, 2017, available at http://www.tapedaily.com/technological-race-car-keep-driver-awake-focused/.

A. Eskandarian, Abstract for "Drowsy and Fatigued Driving Problem Significance and Detection Based on Driver Control Functions," Handbook of Intelligent Vehicles, accessed Jan. 23, 2017, available at http://rd.springer.com/referenceworkentry/10.1007/978-0-85729-085-4_36.

* cited by examiner

VEHICLE COMMUNICATION SYSTEM

FIELD

The subject matter described herein relates to communications between vehicles.

BACKGROUND

Vehicle systems may be formed of two or more propulsion-generating vehicles that travel together along routes. The movements of these vehicles may be controlled by an operator onboard one of the vehicles. The vehicles may be communicatively coupled by wired or wireless connections between the vehicles. The operator may remotely control other vehicles in the vehicle system by directing control signals to be communicated to the other vehicles. One arrangement of vehicles can be referred to as a distributed power (DP) arrangement.

Occasionally, the vehicle system and the DP arrangement may need to be remotely controlled by an operator that is off-board the vehicle system. This may occur, for example, when a dismounted operator needs to drive a rear propulsion-generating vehicle of the vehicle system. Furthermore, the vehicle system may need to be divided into two or more segments through a portion of a route. For example, when setting out (e.g., removing) a non-propulsion generating vehicle from the vehicle system for delivery or due to a vehicle failure. This situation can occur, for example, when a rear vehicle needs to move in a direction that is different than the lead vehicle.

In order to remotely control the movement of individual propulsion-generating vehicles, the dismounted operator needs to communicatively disconnect from the lead vehicle of the vehicle system, and reconnect with the non-lead propulsion-generating vehicle. This may occur, for example, when the operator performs complex moves in the vehicle system before or after cutting the vehicle system into two or more segments. However, disconnecting from the lead vehicle and reconnecting with a non-lead vehicle is time consuming and may lead to increasing operating costs, decreasing operating revenue, and/or decreasing productivity of the customer.

BRIEF DESCRIPTION

In one embodiment, a system includes one or more processors configured to communicatively link a first operator control unit disposed off-board a vehicle system with a vehicle control system disposed onboard the vehicle system. The vehicle system is formed from at least first and second vehicles. The vehicle control system is configured to remotely control movement of the second vehicle from the first vehicle in the vehicle system, wherein the one or more processors also are configured to receive a control signal communicated from the first operator control unit that is disposed off-board the vehicle system to a communication device that is onboard the first vehicle. The control signal dictates a change in movement operational setting of the second vehicle. The one or more processors are also configured to direct the communication device to communicate the control signal from the first vehicle to the second vehicle via the vehicle control system, wherein movement of the second vehicle is automatically changed responsive to communicating the control signal from the communication device onboard the first vehicle to the second vehicle via the vehicle control system.

In one embodiment, a method includes communicatively linking a first operator control unit disposed off-board a vehicle system with a vehicle control system disposed onboard the vehicle system. The vehicle system is formed from at least first and second vehicles. The vehicle control system is configured to remotely control movement of the second vehicle from the first vehicle in the vehicle system. The method includes communicating a control signal from the first operator control unit that is off-board the vehicle system to a communication device that is onboard the first vehicle, the control signal dictating a change in a movement operational setting of the second vehicle, and communicating the control signal from the communication device onboard the first vehicle to the second vehicle via the vehicle control system onboard the vehicle system, wherein movement of the second vehicle is automatically changed responsive to communicating the control signal from the communication device onboard the first vehicle to the second vehicle via the vehicle control system.

In one embodiment, a system includes a communication device configured to be onboard a first vehicle of a vehicle system that also includes a second vehicle. The system includes a controller configured to be disposed onboard the first vehicle for controlling movement of the first vehicle. The controller is configured to receive a control signal from an off-board operator control unit via the communication device. The control signal dictates movement of the vehicle system, wherein the communication device is configured to send the control signal from the operator control unit to the second vehicle.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
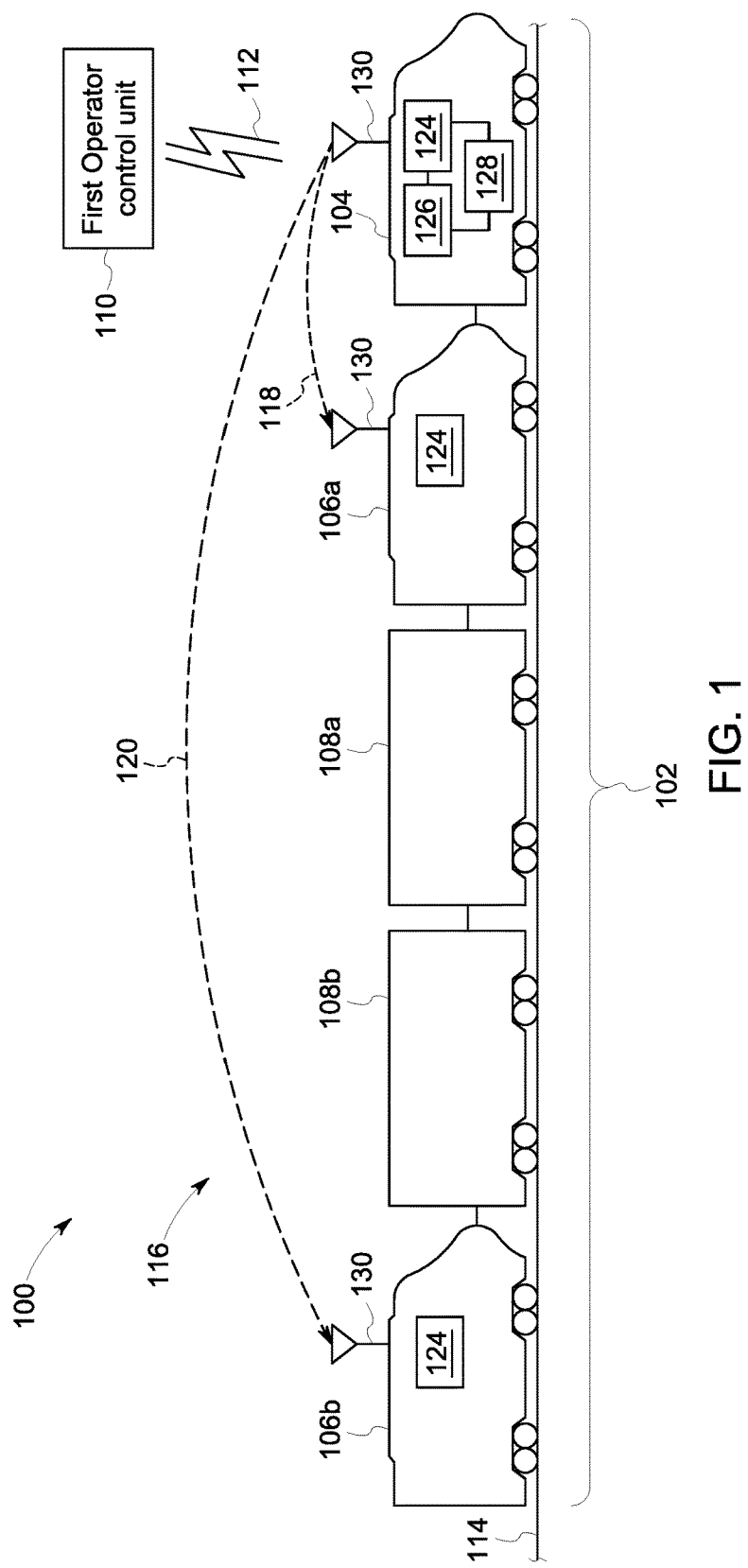
FIG. 1 illustrates a schematic illustration of a system of a vehicle system in accordance with one embodiment.

One or more embodiments of the inventive subject matter described herein relate to systems and methods that enable a vehicle system having a distributed power (DP) arrangement to be remotely controlled by an operator off-board the vehicle system. The operator of the remote operator control unit remotely communicates control signals to a lead vehicle dictating a change in a movement operational setting (e.g., tractive efforts and/or braking efforts) of one or more non-lead vehicles in the vehicle system. The lead vehicle communicates the control signals received from the off-board operator control unit to the one or more non-lead vehicles in the vehicle system. At least one technical effect described herein includes allowing the operator off-board the vehicle system to remotely control the movement of the one or more non-lead vehicles of the vehicle system while staying communicatively connected to the lead vehicle. This can result in a more efficient completion of complex moves before and/or after cutting the vehicle system. Another technical effect described herein includes the addition of a second operator control unit that may remotely control the movement of the vehicle system. This can allow for multiple dismounted operators to control multiple vehicle systems in a pitch-and-catch effort (e.g., the remote control of the vehicle system is pitched from a first operator control unit to a second operator control unit).

Additionally, one or more embodiments of the inventive subject matter described herein provides for systems and methods for communicating between propulsion-generating vehicles in a vehicle consist or vehicle system. This subject matter may be used in connection with rail vehicles and rail vehicle systems, or alternatively may be used with other types of vehicles. For example, the subject matter described herein may be used in connection with automobiles, trucks, mining vehicles, other off-highway vehicles (e.g., vehicles that are not designed or are not legally permitted for travel on public roadways), aerial vehicles (e.g., fixed wing aircraft, drones or other unmanned aircraft, etc.), or marine vessels.

The vehicle consist or vehicle system can include two or more vehicles mechanically coupled with each other to travel along a route or in the same region together. Optionally, the vehicle system can include two or more vehicles that are not mechanically coupled with each other, but that travel along a route together. For example, two or more automobiles may wirelessly communicate with each other as the vehicles travel along the route together as a vehicle system to coordinate movements with each other.

In operation, a lead vehicle can obtain unique vehicle identifiers associated with the remote vehicles included in the same vehicle system as the lead vehicle. These vehicle identifiers may not include identifiers associated with remote vehicles that are not included in the vehicle system. The vehicle identifiers may be obtained from a system such as a vehicle control system that restricts movement of vehicle system based on locations of the vehicle system. For example, such a system may include a positive train control (PTC) system. Optionally, the vehicle identifiers may be obtained from an energy management system, such as a system that creates a trip plan that designates operational settings of the vehicle system as a function of time, location, and/or distance along a route to control movement of the vehicle system. Additionally or alternatively, the vehicle identifiers of the remote vehicles in the vehicle system may be manually input by an operator or obtained from another system.

The lead vehicle can communicate wireless linking messages to the remote vehicles. These linking messages may be addressed to the remote vehicles using the vehicle identifiers. For example, the linking messages may include the vehicle identifiers. Vehicles that receive the linking messages other than the remote vehicles in the consist may not be linked with the lead vehicle due to the vehicle identifiers not matching or being associated with these other vehicles. At the remote vehicles that are included in the vehicle system, the remote vehicles may be communicatively linked with the lead vehicle. For example, the remote vehicles may communicate linking confirmation messages responsive to receiving the linking messages.

The remote vehicles can communicate these confirmation messages without an operator having to enter onboard the remote vehicles. For example, while an operator may be onboard the lead vehicle, the operator may not enter onboard any other vehicles in the vehicle system to establish communication links between the lead and remote vehicles in the vehicle system. Upon receiving the confirmation messages at the lead vehicle, communication links between the lead and remote vehicles are established. Establishing these communication links allows for the lead vehicle to remotely control operations of the remote vehicles during movement of the vehicle system along the route. For example, the lead vehicle can communicate wireless command messages to change throttle settings, brake settings, speeds, power outputs, or the like of the remote vehicles during movement of the vehicle system. Other vehicles that do not have communication links established with the lead vehicle cannot be remotely controlled by the lead vehicle.

FIG. 1 illustrates one embodiment of a system 100 of a vehicle system 102. The illustrated vehicle system 102 includes propulsion-generating vehicles 104, 106 and non-propulsion-generating vehicles 108 that travel together along a route 114. Although the vehicles 104, 106, 108 are shown as being mechanically coupled with each other, optionally the vehicles may not be mechanically coupled with each other.

The propulsion-generating vehicles 104, 106 are shown as locomotives, the non-propulsion-generating vehicles 108 are shown as rail cars, and the vehicle system 102 is shown as a train in the illustrated embodiment. Alternatively, the vehicles 104, 106 may represent other vehicles, such as automobiles, marine vessels, or the like, and the vehicle system 102 can represent a grouping or coupling of these vehicles. The number and arrangement of the vehicles 104, 106, 108 in the vehicle system 102 are provided as one example and are not intended as limitations on all embodiments of the subject matter described herein.

The propulsion-generating vehicles 104, 106 can be arranged in a distributed power (DP) arrangement. For example, the propulsion-generating vehicles 104, 106 can include a first vehicle 104 that issues control signals to second vehicles 106. The designations "first" and "second" are not intended to denote spatial locations of the propulsion-generating vehicles 104, 106 in the vehicle system 102, but instead are used to indicate which propulsion-generating vehicle 104, 106 is communicating (e.g., transmitting, broadcasting, or a combination of transmitting and broadcasting) control signals and which propulsion-generating vehicle 104, 106 is being remotely controlled using the control signals. For example, the first vehicle 104 may or may not be disposed at the front end of the vehicle system 102 (e.g., along a direction of travel of the vehicle system 102). Additionally, the remote second vehicles 106 need not be separated from the first vehicle 104 or may be separated from the first vehicle 104 by one or more other propulsion-generating vehicles 106 and/or non-propulsion-generating vehicles 108.

The control signals issued by the first vehicle 104 to the second vehicles 106 may include directives that direct operations of the remote second vehicles. These directives can include propulsion commands that direct propulsion subsystems of the second vehicle to move at a designated speed and/or power level, brake commands that direct the second vehicle to apply brakes at a designated level, and/or other commands, or the like. The first vehicle 104 issues the control signals to coordinate the tractive efforts and/or braking efforts provided by the propulsion-generating vehicles 104, 106 in order to propel the vehicle system 102 along the route 114, such as a track, road, waterway, or the like.

The control signals can be communicated using a communication system 116. In one embodiment, the control signals are wirelessly communicated using the communication system 116. The communication system 116 may include one or more components onboard the propulsion-generating vehicles 104, 106 that are used to establish a communication link between the vehicles 104, 106 and one or more other propulsion-generating vehicles in the same vehicle system 102.

The communication system 116 may include wireless transceiving hardware and circuitry disposed onboard two or more of the propulsion-generating vehicles 104, 106. For example, the second vehicle 106*a* may be remotely controlled by the first vehicle 104 by a communication link 118 established between the first and second vehicles 104, 106*a*. The second vehicle 106*b* may be remotely controlled by the first vehicle 104 by a communication link 120 established between the first and second vehicles 104, 106*b*. Additionally or alternatively, the propulsion-generating vehicles may be communicatively linked through a wired connection between one or more of the propulsion-generating vehicles 104, 106 and/or non-propulsion generating vehicles 108.

The communication links 118, 120 between the first and second vehicles 104, 106 may be established without an operator having to go onboard the second vehicle 106. The communication links 118, 120 may communicate uniform and/or non-uniform control signal commands. For example, the communication link 118 may instruct a first set of control signal commands to the second vehicle 106*a* that is the same and/or different than a second set of control signal commands communicated to the second vehicle 106*b* over the communication link 120.

The propulsion-generating vehicles 104, 106 each include a vehicle control system 124 disposed onboard the vehicles 104, 106. The vehicle control system 124 can include hardware circuits or circuitry that include and/or are connected with one or more processors. The vehicle control system 124 can control or limit movement of the propulsion-generating vehicles 104, 106 and/or the vehicle system that includes the vehicles 104, 106 based on one or more limitations. For example, the vehicle control system 124 can prevent the vehicle and/or the vehicle system from entering a restricted area, can prevent the vehicle and/or vehicle system from exiting a designated area, can prevent the vehicle and/or vehicle system 102 from traveling at a speed that exceeds an upper speed limit, can prevent the vehicle and/or vehicle system from traveling at a speed that is less than a lower speed limit, can prevent the vehicle and/or vehicle system from traveling according to a designated trip plan generated by an energy management system, can prevent the vehicle and/or vehicle system from traveling according to one or more control signals received by an off-board operator control unit, or the like. The vehicle control systems 124 will be discussed in more detail with FIG. 2.

The vehicle control systems 124 facilitate the distributed power (DP) system of the vehicle system 102. The vehicle control system 124 of the first vehicle 104 remotely controls movement of the second vehicles 106 (or one or more additional propulsion-generating vehicles) of the vehicle system 102. For example, the vehicle control system 124 remotely controls the movement of the vehicle system 102 by communicating operational settings such as one or more of a throttle notch setting, a brake setting, speed setting, or the like, to the one or more additional propulsion-generating vehicles. Optionally, the vehicle control system 124 of any propulsion-generating vehicle may remotely control the movement of the one or more additional propulsion-generating vehicles. For example, the second vehicle 106*a* may remotely control movement of the first vehicle 104 and/or the second vehicle 106*b*.

The first vehicle 104 includes a control mediation system 126 disposed onboard the first vehicle 104. The control mediation system 126 represents hardware circuitry that includes and/or is connected with one or more processors (e.g., microprocessors, controllers, field programmable gate arrays, integrated circuits, or the like). The control mediation system 126 is operably connected with the vehicle control system 124 of the first vehicle 104. Optionally, the control mediation system 126 may be disposed off-board the vehicle system 102 and wirelessly communicated with the vehicle control system 124. Additionally or alternatively, one or more of the second vehicles 106 may also include a control mediation system 126. For example, the first vehicle 104 and second vehicle 106*a* may each include a control mediation system 126.

The control mediation system 126 is operably connected with a first operator control unit (OCU) 110 that is disposed off-board the vehicle system 102. The first OCU 110 is controlled by an operator off-board (e.g., dismounted from) the vehicle system 102. The first OCU 110 remotely controls movement of the vehicle system 102 by communicating movement operational settings to the control mediation system 126 onboard the first vehicle 104. The first OCU 110 is communicatively linked with the vehicle control system 124 of the first vehicle 104 by a communication link 112 established between the first OCU 110 and the control mediation system 126. For example, the first vehicle 104 may send and/or receive communication signals with the first OCU 110.

The control mediation system 126 is connected with a speed regulator 128. The speed regulator 128 can include software and/or hardware circuits that include and/or are connected with one or more processors. The speed regulator 128 receives feedback (e.g., continuously, intermittently, periodically, or the like) from the vehicles 104, 106 of the vehicle system 102 indicating the current speed of the vehicles 104, 106 of the vehicle system 102. The speed regulator may utilize the speed feedback in order to determine a new throttle notch setting for the vehicles 104, 106 and/or the vehicle system 102. For example, the speed regulator 128 may receive feedback that the vehicle system 102 is traveling at a speed of 75 kilometers per hour. The speed regulator 128 may communicate by the communication links 118 and 120 a new throttle notch setting and/or brake setting to the propulsion-generating vehicles of the vehicle system 102 in order for the vehicle system 102 to reduce the speed to 30 kilometers per hour.

The first OCU 110 communicates control signals to the vehicle system 102 by the communication link 112. The control signals dictate a change in a movement operational setting of one or more vehicles 104, 106 of the vehicle system 102. For example, the control signals may dictate a speed reduction for the second vehicle 106*b*. The speed regulator 128 may determine a new throttle notch setting for the second vehicle 106*b* based on the control signal communicated by the first OCU 110. Additionally or alternatively, the one or more processors of the control mediation system 126 can one or more of receive, examine, or direct the control signals to one or more of the vehicle control system 124 of the first vehicle 104 or the second vehicles 106 in order for the vehicle control system 124 to apply the control signals. The control signals may be movement operational settings that include one or more of a throttle notch setting, a brake setting, speed setting, or the like. The control mediation system 126 communicatively links the first OCU 110 with the vehicle system 102 in order for the first OCU 110 to remotely control the movement of the vehicle system 102. The first OCU 110 will be described in further detail below with FIG. 3.

Figure 2:
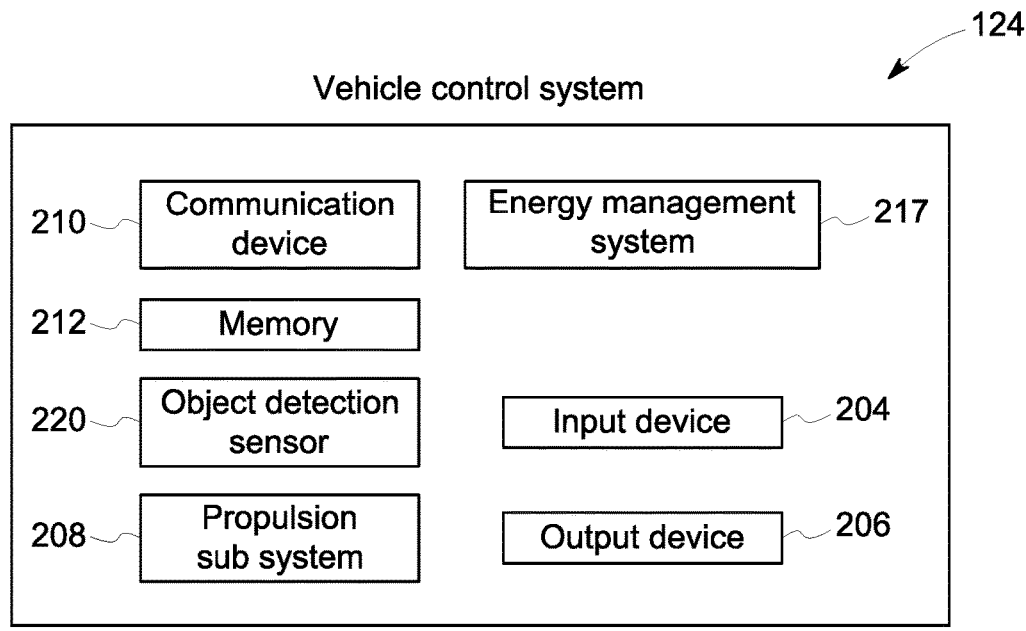
FIG. 2 illustrates a schematic illustration of a vehicle control system for a propulsion-generating vehicle in accordance with one embodiment.

FIG. 2 is a schematic illustration of the vehicle control system 124 disposed onboard the propulsion-generating vehicles 104, 106 in accordance with one embodiment. The vehicle control system 124 controls operations of the vehicles 104, 106. The vehicle control system 124 can include or represent one or more hardware circuits or circuitry that include, are connected with, or that both include and are connected with one or more processors, controllers, or other hardware logic-based devices. The vehicle control system 124 is connected with an input device 204 and an output device 206. The vehicle control system 124 can receive manual input from an operator of the propulsion generating vehicles 104, 106 through the input device 204, such as a touchscreen, keyboard, electronic mouse, microphone, or the like. For example, the vehicle control system 124 can receive manually input changes to the tractive effort, braking effort, speed, power output, and the like, from the input device 204. The vehicle control system 124 may receive a single instance of an actuation of the input device 204 to initiate the establishment of a communication link (e.g., the communication links 118, 120 of FIG. 1) between the propulsion generating vehicles 104, 106 in the vehicle system 102. For example, instead of having one or more operators go onboard first and second vehicles 104, 106 of the vehicle system 102 to establish communication links for the remote control of the second vehicle 106 by the first vehicle 104, an operator may go onboard the first vehicle 104 and press a single button or other input device to cause the first vehicle 104 to communicate linking messages to the remote second vehicles 106 to establish the communication links.

The vehicle control system 124 can present information to the operator of the vehicles 104, 106 using the output device 206, which can represent a display screen (e.g., touchscreen or other screen), speakers, printer, or the like. For example, the vehicle control system 124 can present the identities and statuses of the propulsion vehicles 104, 106, identities of the missing propulsion vehicles (e.g., those vehicles from which the first vehicle 104 has not received the status), contents of one or more command messages, or the like.

The vehicle control system 124 is connected with a propulsion subsystem 208 of the propulsion-generating vehicles 104, 106. The propulsion subsystem 208 provides tractive effort and/or braking effort of the propulsion-generating vehicles. The propulsion subsystem 208 may include or represent one or more engines, motors, alternators, generators, brakes, batteries, turbines, and the like, that operate to propel the propulsion-generative vehicles 104, 106 under the manual or autonomous control that is implemented by the vehicle control system 124. For example, the vehicle control system 124 can generate control signals autonomously or based on manual input that is used to direct operations of the propulsion subsystem 208.

The vehicle control system 124 is connected with a communication device 210 and a memory 212 of the communication system 116 in the propulsion-generating vehicles 104, 106. The memory 212 can represent an onboard device that electrically and/or magnetically stores data. For example, the memory 212 may represent a computer hard drive, random access memory, read-only memory, dynamic random access memory, an optical drive, or the like. The communication device 210 includes or represents hardware and/or software that is used to communicate with other vehicles in the vehicle system 102. For example, the communication device 210 may include a transceiver and associated circuitry (e.g., antennas 130 of FIG. 1) for wirelessly communicating (e.g., communicating and/or receiving) linking messages, command messages, reply messages, repeat messages, or the like. Optionally, the communication device 210 includes circuitry for communicated the messages over a wired connection, such as an electric multiple unit (eMU) line of the vehicle system 102 (not shown), catenary or third rail of electrically powered vehicles, or another conductive pathway between or among the propulsion-generating vehicles 104, 106 in the vehicle system 102.

The vehicle control system 124 may control the communication device 210 by activating the communication device 210. The vehicle control system 124 can examine the messages that are received by the communication device 210. For example, the vehicle control system 124 of a second vehicle 106 can examine received command messages to determine the directive sent by the first vehicle 104. The vehicle control system 124 implements the directive by creating control signals that are communicated to the propulsion subsystem 208 for autonomous control or presenting the directive to the operator on the output device 206 for manual implementation of the directive.

The vehicle control system 124 is connected with an energy management system 217. The energy management system 217 can include hardware circuits or circuitry that include and/or are connected with one or more processors. The energy management system 217 can create a trip plan for trips of the vehicles 104, 106 and/or the vehicle system 102 that includes the vehicle 104, 106. A trip plan may designate operational settings of the propulsion-generating vehicles 104, 106 and/or the vehicle system 102 as a function of one or more of time, location, or distance along a route for a trip. Traveling according to the operational settings designated by the trip plan may reduce fuel consumed and/or emissions generated by the vehicles and/or the vehicle system relative to the vehicles and/or vehicle system traveling according to other operational settings that are not designated by the trip plan. The identities of the vehicles in the vehicle system 102 may be known to the energy management system 217 so that the energy management system 217 can determine what operational settings to designate for a trip plan to achieve a goal of reducing fuel consumed and/or emissions generated by the vehicle system 102 during the trip.

The vehicle control system 124 is connected with an object detection sensor 220. The object detection sensor 220 can include hardware circuits or circuitry and/or software that include and/or are connected with one or more processors. The detection sensor 220 can obtain sensor data that is indicative of a presence of an object ahead (e.g., generally in front of) of the vehicle system 102 in a direction of travel of the vehicle system 102. The detection sensor 220 may include a camera that obtains still and/or video images of an area of the route in the direction of travel of the vehicle. For example, the detection sensor 220 may be a camera that captures the still image of a fallen tree across the route ahead of the vehicle system 102 in the direction of travel of the vehicle system 102. Optionally, the detection sensor 220 may include a radar system that sends and receives pulses reflected off an object in order to detect the presence of an object ahead of the vehicle and/or vehicle system 102. Optionally, the detection sensor 220 may be an alternative sensing system that detects the presence of an object in an area ahead of the vehicle and/or vehicle system 102. The detection sensor 220 may detect the presence of an object a distance of 2 feet, 25 feet, 100 feet, 500 feet, 1000 feet, or the like ahead of the vehicle system 102.

The object detection sensor 220 may include one or more sensing devices positioned around the vehicle (not shown). For example, a sensing device of the detection sensor 220 may be positioned on a front and/or rear end of the vehicles 104, 106 in order to obtain sensor data for the vehicle and/or vehicle system that travels in first direction and an opposite second direction (e.g., back and forth). Additionally or alternatively, a sensing device may be positioned on one or more of an exterior and/or interior of the vehicle. Optionally, any number and/or placement of sensing devices may be use. The vehicle control system 124 prevents movement of the vehicle system 102 towards the detected object regardless of one or more control signals communicated by the first OCU 110. For example, the vehicle control system 124 may override control signals directing the movement of the vehicle system 102 from the first OCU 110 when an object and/or an issue with the route 114 has been detected.

The object detection sensor 220 is operably connected with the vehicle control system 124 such that the vehicle control system 124 prevents movement of the vehicle system in the presence of an object detected by the detection sensor 220 ahead of the vehicle system 102 in the direction of travel of the vehicle system 102. For example, the vehicle control system 124 may detect an object ahead of the vehicle system 102 and direct the propulsion subsystem 208 to apply the brakes in order to slow and/or bring the vehicle to a stop.

Figure 3:
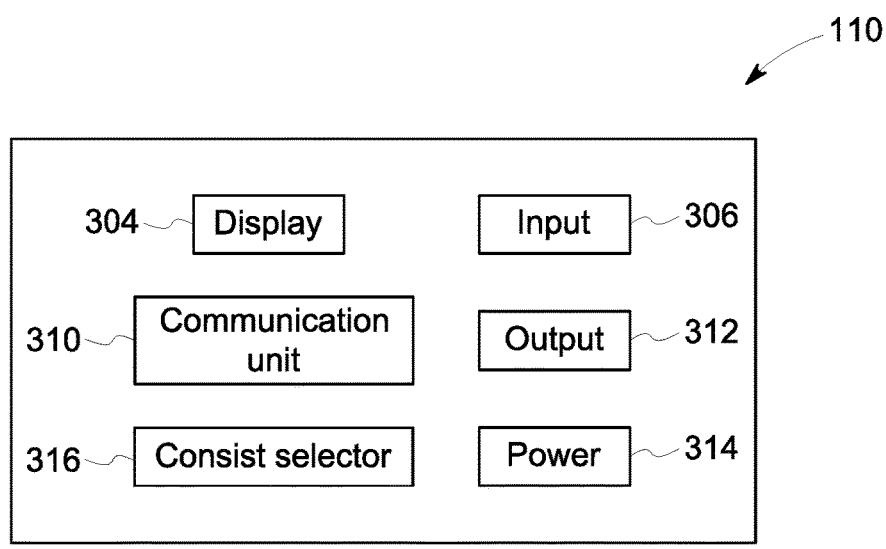
FIG. 3 illustrates a schematic illustration of an operator control unit in accordance with one embodiment.

FIG. 3 is a schematic illustration of the first operator control unit (OCU) 110 of FIG. 1. The first OCU 110 remotely controls operations of the vehicle system 102. For example, the first OCU 110 remotely controls movement of the vehicle system 102 by communicating with the control mediation system 126 by the communication link 112. The first OCU 110 represents hardware circuitry that includes and/or is connected with one or more processors (e.g., microprocessors, controllers, field programmable gate arrays, integrated circuits, or the like).

The first OCU 110 generates control signals that are communicated by a communication unit 310. The control signals remotely control movement of the propulsion-generating vehicles 104 106. The communication unit 310 can one or more or send or receive communication signals sent from the vehicle system 102 by the communication link 112 between the control mediation system 126 and the first OCU 110. The first OCU 110 receives one or more of image data and/or sensor data detected by the object detection sensor 220 onboard the propulsion-generating vehicles 104, 106. For example, the first OCU 110 may receive image data from the detection sensor 220 via the control mediation system 126 that is representative of an area ahead of the direction of travel of the vehicle system 102. Optionally, the first OCU 110 may receive status notifications such as damaged equipment, current operational settings, location, or the like of the vehicles of the vehicle system 102.

The first OCU 110 includes a consist selector 316. The consist selector 316 allows the first OCU 110 to communicate to the control mediation system 126 to direct the generated control signals to a propulsion-generating vehicle 104, 106 of the vehicle system 102. For example, the lead vehicle 104 may be separated from (e.g., mechanically detached) the second vehicle 106b but may continue to communicate by the communication link 120. The operator of the first OCU 110 may use the consist selector 316 to direct control signals to the separated second vehicle 106b. For example, the first OCU 110 may communicate control signals to the control mediation system 126 that are to be directed to the second vehicle 106b. The control mediation system 126 of the lead vehicle 104 may receive and redirect the generated control signals to the second vehicle 106b.

The first OCU 110 can include one or more input devices 306 and/or output devices 312 such as a keyboard, an electronic mouse, stylus, microphone, touch pad, or the like. Additionally or alternatively, the input and/or output devices 306, 312 may be used to communicate with an operator of the vehicle system 102. The first OCU 110 can include one or more displays 304 such as touchscreen, display screen, electronic display, or the like. The displays 304 may visually, graphically, statistically, or the like display information to the operator of the first OCU 110. The first OCU 110 is operably connected with the components of the vehicle system 102. Additionally or alternatively, the first OCU 110 may be operable connected with components or alternative systems onboard and/or off-board the vehicle system 102.

In one example, the detection sensor 220 of the vehicle control system 124 obtains the sensor data and the communication device 210 of the vehicle control system 124 communicates the obtained sensor data to one or more of the control mediation system 126 (of FIG. 1) or the second propulsion-generating vehicle 106 of the vehicle system 102. The one or more processors of the control mediation system 126 one or more of receives, examines, or directs the obtained sensor data to the first OCU 110. The control mediation system 126 communicates the obtained sensor data to the first OCU 110 in order to visually present the obtained sensor data to the off-board operator of the first OCU 110 on the one or more displays 304. For example, the display 304 presents the image (e.g., still and/or motion), sensor data, or the like indicative of a presence of an object ahead of the vehicle system 102 in the direction of travel of the vehicle system, communicated from the first vehicle 104 to the operator of the first OCU 110.

The first OCU 110 can include a power unit 314. The power unit 314 powers the first OCU 110. For example, the power unit 314 may be a battery and/or circuitry that supplies electrical current to power other components of the first OCU 110. Additionally or alternatively, the power unit 314 may provide electrical power to the vehicle system 102.

Returning to FIG. 1, the vehicle control system 124 of the first vehicle 104 is communicatively linked with the vehicle control system 124 of the second vehicle 106a by the communication link 118, and the vehicle control system 124 of the first vehicle 104 is communicatively linked with the vehicle control system 124 of the second vehicle 106b by the communication link 120. For example, the vehicle control system 124 of the first vehicle 104 may send control signals to one or more of the second vehicles 106a, 106b.

The first OCU 110 remotely controls movement of the vehicle system 102 by sending control signals to the vehicle control system 124 of the first vehicle 104 via the control mediation system 126. The control signals dictate a change in a movement operational setting of one or more of the first vehicle 104 or the second vehicles 106. The control signals include throttle settings, brake settings, speed setting, or the like. For example, the control mediation system 126 communicates the received control signals received from the first OCU 110 to the vehicle control system 124 onboard the first vehicle 104, wherein the vehicle control system 124 of the first vehicle 104 communicates the received control signals to the vehicle control systems 124 of the second vehicles 106a, 106b. The movement of the second vehicles 106a, 106b is automatically changed responsive to the first vehicle 104 communicating the control signals from the first OCU 110 to the first vehicle 104. For example, the control signals from the first OCU 110 may dictate the second vehicle 106a to increase the throttle notch setting to 5 and may dictate the second vehicle 106b to increase the throttle notch setting to 6. The vehicle control system 124 of the first vehicle 104 communicates these changes to the movement operational settings to the second vehicles 106a, 106b, wherein the second vehicle 106a automatically changes the throttle notch setting to 5 upon receipt of the control signal, and the second vehicle 106b automatically changes the throttle notch setting to 6 upon receipt of the control signal.

In one example, the control signals dictated by the first OCU 110 may direct the first vehicle 104 to move in a first direction and the second vehicle 106 to move in a different second direction. Optionally, the control signals from the first OCU 110 may direct the first vehicle 104 to proceed on the same route 114 but direct the second vehicle 106 (e.g., communicated via the vehicle control system of the first vehicle) to proceed on a second route. For example, the first and second vehicles 104, 106 may be disconnected (e.g., not mechanically coupled) and may proceed along different routes at a rail switch. Optionally, the control signals dictated by the first OCU 110 may direct the first vehicle 104 to continue to move in the direction of travel of the vehicle system and direct the second vehicle 106 (e.g., communicated via the vehicle control system of the first vehicle) to move in a direction that is opposite the direction of concurrent movement of the first vehicle 104. For example, the control signals may dictate the first vehicle 104 to continue to travel in a first direction (e.g., forward) and direct the second vehicle 106 to travel in the opposite direction (e.g., backwards) as the first vehicle 104 along the route. Optionally, the control signals from the first OCU 110 may direct the first vehicle 104 to proceed in a first direction, and direct the second vehicle 106 (e.g., communicated via the first vehicle 104 by communication link 118) to move in a second, opposite direction for a first period of time, then back in the same first direction for a second period of time in order to mechanically couple the first and second vehicles 104, 106. Optionally, the first OCU 110 may direct the first vehicle 104 to continue to move in the direction of travel of the vehicle system and direct the second vehicle 106 to continue to move in the direction of travel of the vehicle system but at a speed slower than a speed of the first vehicle (e.g., to expand a distance between the first and second vehicles 104, 106). Optionally, the first OCU 110 may direct the first and second vehicles 104, 106 to move in any combination of varying control signals (e.g., the same direction, different directions, same speed, different speeds, or the like).

Figure 4:
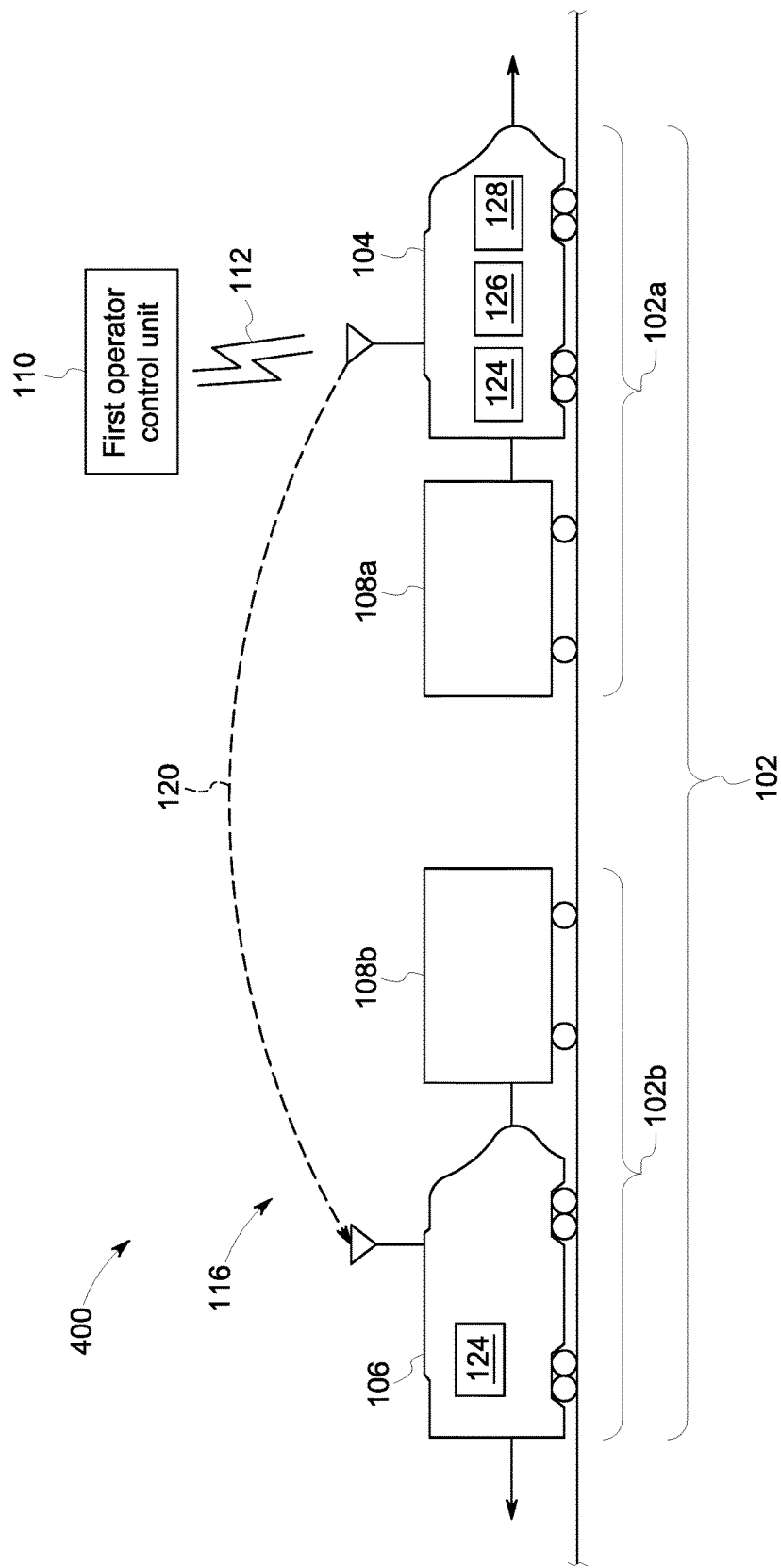
FIG. 4 illustrates a schematic illustration of a system of a vehicle system in accordance with one embodiment.

FIG. 4 illustrates a system 400 (corresponding to the system 100) of a vehicle system 102 in accordance with one embodiment. The vehicle system 102 is separated into two consists 102a and 102b. The consist 102a includes at least one propulsion-generating vehicle 104, and the consist 102b includes at least one propulsion-generating vehicle 106. Optionally, one or more non-propulsion generating vehicles 108 may be included in one or more of the consists 102a, 102b. The lead vehicle 104 includes the control mediation system 126 and the speed regulator 128 (corresponding to the systems of FIG. 1). The lead vehicle 104 and the second vehicle 106 include vehicle control systems 124 (corresponding to the systems of FIG. 1). The lead vehicle 104 of the consist 102a is communicatively linked to the first OCU 110 by the communication link 112. Additionally, the lead vehicle 104 is communicatively linked to the second vehicle 106 of the consist 102b by the communication link 120.

Figure 5:
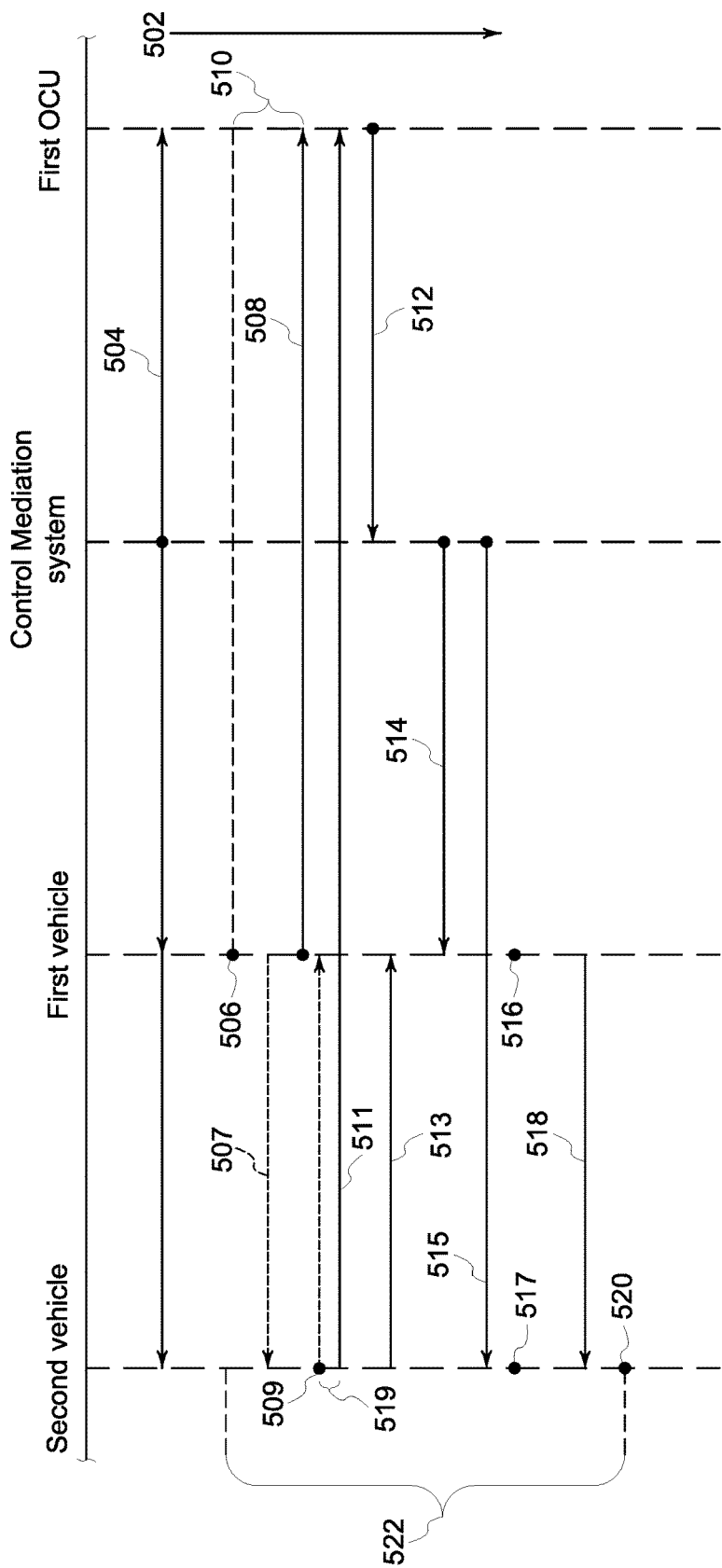
FIG. 5 illustrates a flowchart of a method for communicating control signals in accordance with one embodiment.

FIG. 5 illustrates a flowchart of a method for communicating control signals in accordance with one embodiment. The flowchart proceeds in the direction of 502. The method involves the first OCU 110, the control mediation system 126 onboard the first vehicle 104, the vehicle control system 124 of the first vehicle 104, and the vehicle control system 124 of the second vehicle 106b, wherein the vehicle control system 124 of the first vehicle 104 remotely controls the movement of the second vehicle 106 in the vehicle system 102.

At 504, the first OCU 110 is communicatively linked to the vehicle control system 124 of the first vehicle 104 and the vehicle control system 124 of the second vehicle 106b via the control mediation system 126. For example, the communication link 112 (of FIG. 1) is established between the first OCU 110 and the first vehicle 104, and the communication link 120 (of FIGS. 1 and 4) is established between the first vehicle 104 and the second vehicle 106b in order for the first OCU 110 to communicate control signals to one or more of the first vehicle 104 or the second vehicle 106b of the vehicle system 102.

At 506, the object detection sensor 220 (of FIG. 2) of the first vehicle 104 obtains sensor data. The sensor data is indicative of the presence of an object, damage, or the like ahead of the first vehicle 104 in the direction of travel of the first vehicle 104. Alternatively, the sensor data may indicate that there is no presence of an object, damage, or the like ahead of the vehicle system 102 in the direction of travel of the vehicle system 102. For example, the obtained sensor data may indicate that the route is safe to travel. The sensor data may be one or more of a still image, video images, statistical data, infrared data images, or the like. For example, the detection sensor 220 may capture an image of a fallen tree across a track. At 506, if an object and/or damage is detected, the vehicle control system 124 of the first vehicle 104 slows and/or stops movement of the first vehicle 104. Additionally, at 507, if an object and/or damage is detected, the vehicle control system 124 of the first vehicle 104 communicates a control signal to the vehicle control system 124 of the second vehicle 106b. For example, if the detection sensor 220 of the first vehicle 104 detects the fallen tree and the first and second vehicles 104, 106b are mechanically coupled, the vehicle control system 124 of the first vehicle 104 will communicate control signals to the second vehicle 106b directing the vehicle control system 124 of the second vehicle 106b to slow and/or stop. Alternatively, if the detection sensor does not detect an object, the vehicle system 102 will continue to move.

At 508, the vehicle control system 124 of the first vehicle 104 communicates the obtained sensor data to the first OCU 110 via the control mediation system 126. The sensor data is presented to the operator of the first OCU 110 on the display 304. The sensor data may be presented as an image, video, graphical illustration, warning sound, vibration, or the like. For example, the display of the first OCU 110 may communicate to the operator of the first OCU 110 the sensed object by presenting the image of the fallen tree across the track. Alternatively, the display 304 of the first OCU 110 may communicate to the operator of the first OCU 110 that there has been no object detected.

The steps 506, 507 and 508 continue until the first vehicle 104 has reached a destination. For example, the loop 510 will continue such that the detection sensor may continuously obtain sensor data for the presence of objects along the route ahead of the first vehicle 104 in the direction of travel of the first vehicle 104, and the obtained sensor data may be continuously communicated to the first OCU 110 until the vehicle systems 102, 102a have arrived at a location along the route. Optionally, the loop 510 may continue continuously, intermittently, randomly, in a scheduled pattern, or the like. Additionally or alternatively, the loop 510 may continue until the vehicle systems 102, 102a have reached a target location, come to a stop, or the like.

Similarly, at 509, the object detection sensor 220 of the second vehicle 106b obtains sensor data ahead of the second vehicle 106b in the direction of travel of the second vehicle 106b. For example, if an object and/or damage is detected, the vehicle control system 124 of the second vehicle 106b slows and/or stops movement of the second vehicle 106b. Optionally, the vehicle control system 124 of the second vehicle 106b may communicate a signal to the vehicle control system 124 of the first vehicle 104 indicating that an object and/or damage has been detected.

At 511, the vehicle control system 124 of the second vehicle 106b communicates the obtained sensor data to the first OCU 110 via the control mediation system 126. The sensor data is presented to the operator of the first OCU 110 on the display 304. The sensor data may be presented as an image, video, graphical illustration, warning sound, vibration, or the like. For example, the display of the first OCU 110 may communicate to the operator of the first OCU 110 the sensed object by presenting the image of the fallen tree across the track. Alternatively, the first display 304 of the first OCU 110 may communicate to the operator of the first OCU 110 that there has been no object detected.

The steps 509 and 511 continue until the second vehicle 106b has reached a destination. For example, the loop 519 will continue such that the detection sensor may continuously obtain sensor data for the presence of objects along the route ahead of the second vehicle 106b in the direction of travel of the second vehicle 106b, and the obtained sensor data may be continuously communicated to the first OCU 110 until the vehicle system 102b has arrived at a location along the route. Optionally, the loop 519 may continue continuously, intermittently, randomly, in a scheduled pattern, or the like. Additionally or alternatively, the loop 519 may continue until the vehicle systems 102, 102b have reached a target location, come to a stop, or the like.

At 513, the vehicle control system 124 of the second vehicle 106b communicates the current speed of the vehicle system 102b to the speed regulator 128 of the first vehicle 104. For example, the second vehicle 106b may communicate the current speed and/or throttle notch setting. The second vehicle 106b may continuously, intermittently, periodically, or the like continue to communicate the current speed setting to the speed regulator.

At 512, the first OCU 110 communicates a control signal to the control mediation system 126 onboard the first vehicle 104. The control signal controls movement of the vehicle system 102 and may include one or more of a throttle notch setting, brake setting, speeds, power outputs, or the like for the vehicle systems 102, 102a, 102b. The operator of the first OCU 110 may select the first vehicle 104 or the second vehicle 106b to receive the control signals with the consist selector 316. For example, the first and second vehicles 104, 106b may be separated as illustrated in FIG. 4. The first OCU 110 may direct a control signal to be received by the first vehicle 104 instructing the first vehicle 104 to move in a first direction at a speed of 5 kilometers per hour and/or, the first OCU 110 may direct a control signal to be received by the second vehicle 106b via the control mediation system 126 of the first vehicle 104 instructing the second vehicle 106b to move in a second, different direction than the first vehicle 104. For example, the second vehicle 106b may be directly and/or indirectly coupled to a faulty vehicle 108 that needs repair. The first and second vehicles 104, 106b may temporarily disconnect into the two consists 102a, 102b in order to transfer the faulty vehicle 108 out of the vehicle system 102. The first OCU 110 may direct the second vehicle 106b to travel in a direction different than the first vehicle 104 in order for the second vehicle 160b to dispose of the vehicle 108 at a predetermined location, and then return to the first vehicle 104. Optionally, the first OCU 110 may instruct the vehicles 104, 106b to move in the same direction but at varying speeds. For example, the first OCU 110 may instruct the first vehicle 104 to travel in the first direction at a speed 15 kilometers per hour, and instruct the second vehicle 106b to travel in the same first direction at a speed of 2 kilometers per hour. Alternatively, the first and second vehicles 104, 106b may be directly and/or indirectly mechanically coupled as illustrated in FIG. 1. For example, the first OCU 110 may communicate a control signal directing the propulsion-generating vehicles 104, 106b to reduce the speed of the vehicle system 102 to 40 kilometers per hour.

The speed regulator 128 receives the generated control signals from the first OCU 110 directed to the first vehicle 104 and determines a new throttle notch setting for the first vehicle 104 based on the current speed of the first vehicle 104. At 514, the control mediation system 126 delivers the direction from the first OCU 110 to the vehicle control system 124 of the first vehicle 104. For example, the first OCU 110 may select the first vehicle 104 to receive the generated control signals using the consist selector 316. The control mediation system 126 may deliver the generated control signal and new throttle notch setting from the speed regulator 128 to the vehicle control system 124 of the first vehicle 104 to reduce the speed of the first vehicle 104 to 40 kilometers per hour.

The speed regulator 128 receives the generated control signals from the first OCU 110 directed to the second vehicle 106b and determines a new throttle notch setting for the second vehicle 106b based on the current speed of the second vehicle 106b. At 515, the control mediation system 126 delivers the direction from the first OCU 110 to the vehicle control system 124 of the second vehicle 106b. For example, the first OCU 110 may select the second vehicle 106b to receive the generated control signals using the consist selector 316. The control mediation system 126 may deliver the generated control signals and new throttle notch setting from the speed regulator 128 to the vehicle control system 124 of the second vehicle 106b to reduce the speed of the second vehicle 106b to 10 kilometers per hour.

At 516, the vehicle control system 124 of the first vehicle 104 changes the operational settings of the first vehicle 104 in order to change the movement of the first vehicle 104 to adhere to the operational setting dictated by the first OCU 110. For example, the vehicle control system 124 of the first vehicle 104 directs the propulsion subsystem 208 (of FIG. 2) of the first vehicle 104 to apply the brakes in order to reduce the speed of the first vehicle 104 to 40 kilometers per hour.

Similarly, at 517, the vehicle control system 124 of the second vehicle 106b changes the operational settings of the second vehicle 106b in order to change the movement of the second vehicle 106b to adhere to the operational setting dictated by the first OCU 110 via the control mediation system 126. For example, the vehicle control system 124 of the second vehicle 106b directs the propulsion subsystem 208 of the second vehicle 106b to apply the brakes in order to reduce the speed of the second vehicle 106b to 10 kilometers per hour.

Optionally, at 518, the communication device 210 of the vehicle control system 124 of the first vehicle 104 communicates the dictated control setting to the vehicle control system 124 of the second vehicle 106b of the vehicle system 102 such that the first vehicle 104 remotely controls the movement of the second vehicle 106. For example, the vehicle control system 124 communicates to the vehicle control system 124 of the second vehicle 106b to reduce the speed of the second vehicle 106b to 40 kilometers per hour (e.g., the dictated control signal from the first OCU 110). Optionally, the control signals communicated by the first OCU 110 may not need to be communicated to the second vehicle 106b. For example, the control signals may dictate only a change to the movement of the first vehicle 104.

At 520, the vehicle control system 124 of the second vehicle 106b automatically changes the operational settings of the second vehicle 106b in order to change the movement of the second vehicle 106b to adhere to the communicated change from the first vehicle 104. For example, the vehicle control system 124 of the second vehicle 106b directs the propulsion subsystem 208 to apply the brakes in order to reduce the speed of the second vehicle 106b to 40 kilometers per hour.

The method of FIG. 5 may continue to proceed along the loop 522 until the vehicle systems 102, 102a, and/or 102b have reached a destination. For example, the loop 522 will continue such that the first OCU 110 may continuously communicate control signals to the first vehicle 104, to the second vehicle 106b, or one or more additional propulsion-generating vehicles until the vehicle systems 102, 102a, and/or 102b have arrived at a location along the route. Optionally, the loop 522 may continue continuously, intermittently, randomly, in a scheduled pattern, or the like. Additionally or alternatively, the loop 522 may continue until the vehicle systems 102, 102a, and/or 102b have reached a target location, come to a stop, or the like.

Optionally, the method of FIG. 5 may have more of fewer communications between the first OCU 110, the control mediation system 126, the vehicle control system 124 of the first vehicle 104, and the vehicle control system 124 of the second vehicle 106b. For example, the vehicle control system 124 of the second vehicle 106b may communicate warnings, system status updates, or the like to the vehicle control system 124 of the first vehicle 104. Additionally or alternatively, the vehicle control system 124 of the first vehicle 104 may communicate accumulated warnings, system status updates, operational settings, global positioning (e.g., GPS) location, or the like of the vehicle system 102 to the first OCU 110 via the control mediation system 126. Additionally or alternatively, the vehicle control system 124 of the first vehicle 104 may communicate directly with and/or partially with the first OCU 110. Additionally or alternatively, the first OCU 110 may communicate changes to a route, warnings, operator schedule changes, or the like to the first vehicle 104. Additionally or alternatively, the systems may be used to communicate any additional information between one or more operators onboard or off-board the first vehicle 104, operators of the first OCU 110, operators onboard or off-board the second vehicle 106b, operators of alternative systems, or the like.

Figure 6:
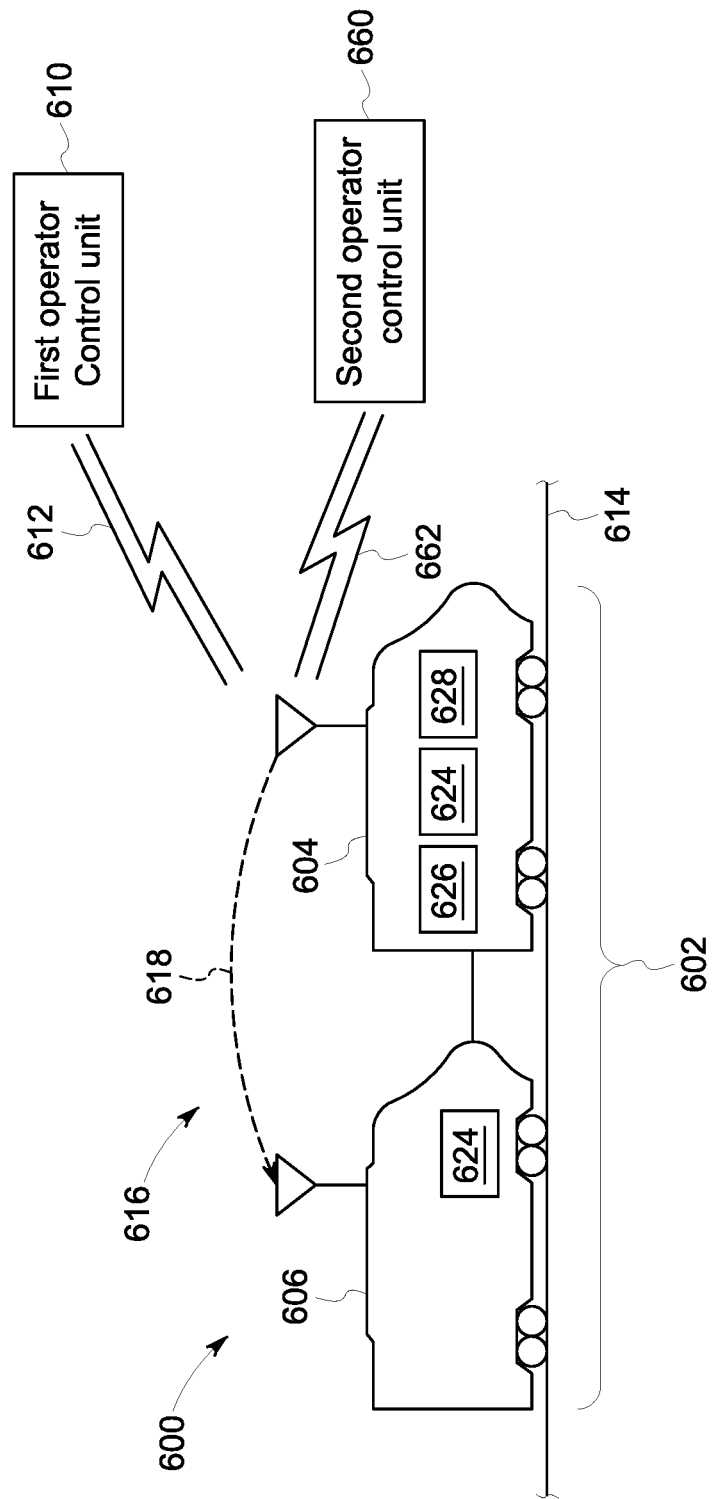
FIG. 6 illustrates a schematic illustration of a system of a vehicle system in accordance with one embodiment.

FIG. 6 illustrates a system 600 of a vehicle system 600 in accordance with one embodiment. The vehicle system 600 includes propulsion-generating vehicles 604, 606 (corresponding to the propulsion-generating vehicles 104, 106 of FIGS. 1 and 4) that travel together along a route 614. Although the vehicles 604, 606 are shown as being mechanically coupled with each other, optionally the vehicles may not be mechanically coupled with each other. For example, the vehicles 604, 606 may be disconnected (as illustrated in FIG. 4). The number and arrangement of the vehicles 604, 606 in the vehicle system 602 are provided as one example and are not intended as limitations on all embodiments of the subject matter described herein.

The propulsion-generating vehicles 604, 606 are arranged in a distributed power (DP) arrangement. For example, the vehicle system 602 can include a first vehicle 604 that issues control signals to the second vehicle 606 in order to remotely control movement of the second vehicle 606. Optionally, the first and second vehicles 604, 606 may be separated by one or more non-propulsion-generating vehicles and/or one or more other propulsion-generating vehicles.

The control signals issued by the first vehicle 604 to the second vehicle 606 may include directives that direct operations of the remote second vehicles. These directives can include propulsion commands that direct propulsion subsystems of the second vehicle 606 to move at a designated speed and/or power level, brake commands, and/or other commands. The first vehicle 604 issues the control signals to coordinate the tractive efforts and/or braking efforts provided by the propulsion-generating vehicles 604, 606 in order to propel the vehicle system 602 along the route 614, such as a track, road, waterway, or the like. Optionally, the first vehicle 604 may issue control signals directing the second vehicle 606 to move in a direction different than a direction of movement of the first vehicle 604 along the route 614.

The control signals can be wirelessly communicated using a communication system 616. The communication system 616 (corresponding to the communication system 116 of FIG. 1) may include one or more components onboard the vehicles 604, 606 that are used to establish a communication link between the vehicles 604, 606 and one or more other propulsion-generating vehicles in the same vehicle system 602. For example, the second vehicle 606 may be remotely controlled by the first vehicle 604 by a communication link 618 established between the first and second vehicles 604, 606.

The vehicles 604, 606 each include a vehicle control system 624 (corresponding to the vehicle control system 124 of FIG. 1) disposed onboard the vehicles 604, 606. The vehicle control systems 624 facilitate the DP system of the vehicle system 602. For example, the vehicle control system 624 of the first vehicle 604 remotely controls movement of the second vehicle 606 of the vehicle system 602 by communicating operational settings such as one or more of a throttle notch setting, a brake setting, speed setting, or the like to the second vehicle 606.

The first vehicle 604 includes a control mediation system 626 and a speed regulator 628 (corresponding to the control mediation system 126 and speed regulator 128 of FIG. 1) disposed onboard the first vehicle 604. The control mediation system 626 is operably connected with a first operator control unit (OCU) 610 that is disposed off-board the vehicle system 602. The first OCU 610 is controlled by an operator off-board the vehicle system 602. The control mediation system 626 is also operably connected with a second operator control unit (OCU) 660 that is disposed off-board the vehicle system 602 that is separate from the first OCU 610. The second OCU 660 is controlled by an operator off-board the vehicle system 602. The operators of the first and second OCUs 610, 660 may by the same individual or different.

The first OCU 610 is communicatively linked to the vehicle control system 624 of the first vehicle 604 by a communication link 612 established between the first OCU 610 and the control mediation system 626. Alternatively, the second OCU 660 is communicatively linked to the vehicle control system 624 of the first vehicle 604 by a communication link 662 established between the second OCU 660 and the control mediation system 626. For example, the vehicle control system 624 is communicatively linked to either the first OCU 610 or the second OCU 660 via the control mediation system 626. For example, the vehicle control system 624 of the first vehicle 604 may be communicatively linked to one of the first OCU 610 or second OCU 660.

The first and second OCUs 610, 660 communicate control signals to the vehicle system 602 by the communication links 612, 662. The control signals dictate a change in a movement operational setting of the vehicle system 602. The one or more processors of the control mediation system 626 one or more of receive, examine, or direct the control signals to the vehicle control system 624 of the first vehicle 604 and/or the vehicle control system 624 of the second vehicle 606 in order for the vehicle control system 624 to apply the control signals. The control signals may be movement operational settings that include one or more of a throttle notch setting, a brake setting, speed setting, or the like. The control mediation system 626 communicatively links the vehicle control system 624 of the first vehicle 604 with the first OCU 610 or the second OCU 660 in order for the first or second OCUs 610, 660 to communicate operational control signals to the vehicle system 602 to remotely control the movement of the vehicle system 602.

In one embodiment, the vehicle control system 624 switches between being communicatively linked with the first OCU 610 by the communication link 612 and being communicatively linked with the second OCU 660 by the communication link 662. For example, the vehicle control system 624 of the first vehicle 604 remotely controlled by the first OCU 610 terminates the communication link 612 with the first OCU 610 in order to allow the second OCU 660 to remotely control the movement of the vehicle system 602 by the communication link 662. For example, switching remote control of the vehicle system 602 from the first OCU 610 to the second OCU 660 allows for the second OCU 660 to communicate control signals to the vehicle control system 624 of the first vehicle 604 and/or the vehicle control system 624 of the second vehicle 606 via the control mediation system 626 in order to remotely control the movement of the vehicle system 602.

Figure 7:
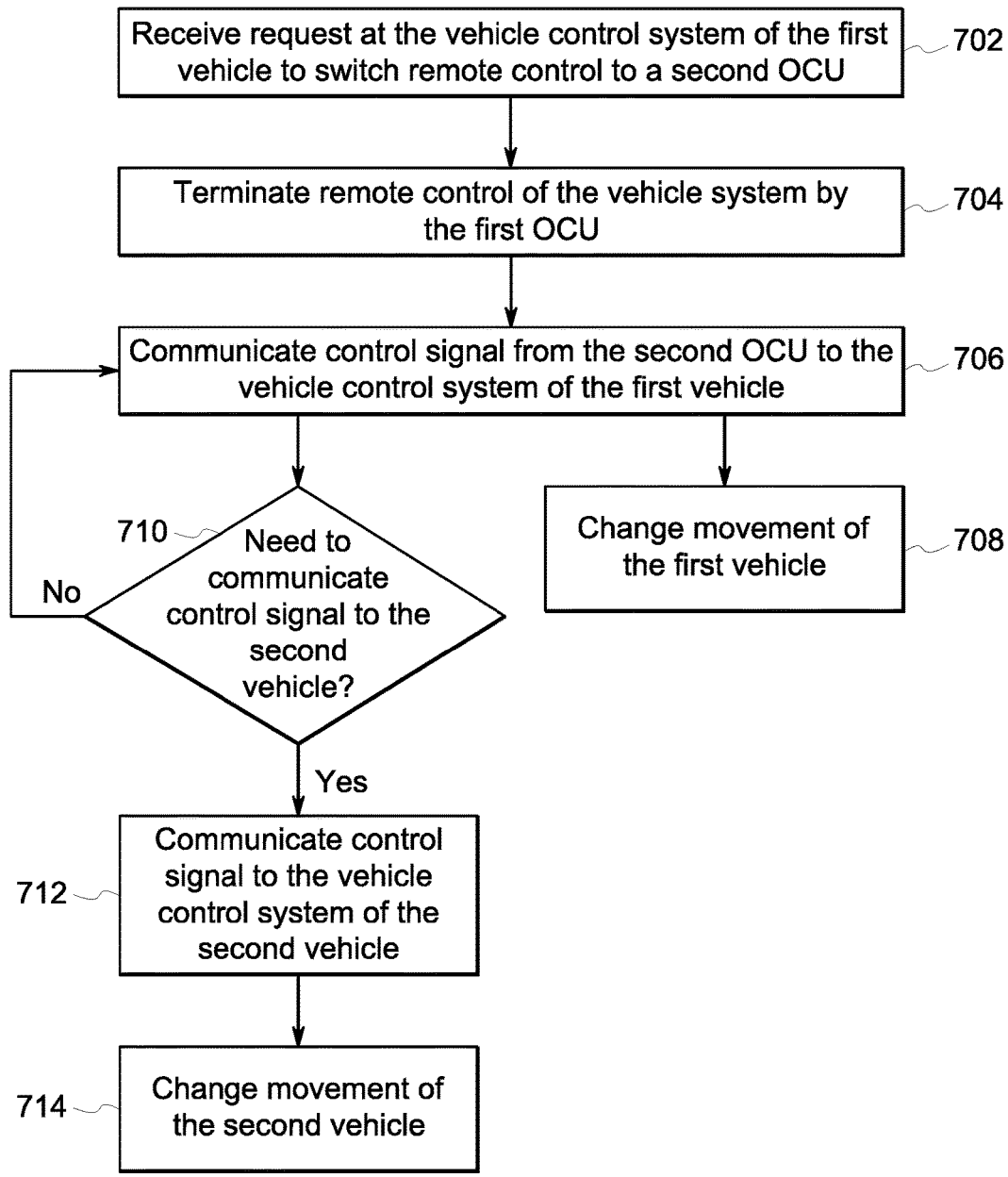
FIG. 7 illustrates a flowchart of a method for communicating control signals in accordance with one embodiment.

FIG. 7 illustrates a flowchart of the method for switching from the first OCU 610 remotely controlling the movement of the vehicle system 602 to the second OCU 660 remotely controlling the movement of the vehicle system 602. Additionally or alternatively, the method may be used in order to switch from the second OCU 660 remotely controlling the vehicle system 602 to the first OCU 610 remotely controlling the vehicle system 602.

At 702, the vehicle control system 624 of the first vehicle 604 receives a request from the first OCU 610 to switch remote control of the movement of the vehicle system 602 to the second OCU 660. For example, the first OCU 610 may request to switch control because the vehicle system 602 has moved beyond a line of sight of the operator of the first OCU 610, because the operator of the first OCU 610 is changing shifts, or for any alternative reason. Alternatively, the vehicle control system 624 of the first vehicle 604 may receive a request from the second OCU 660 to switch remote control of the vehicle system to the second OCU 660. For example, the request to switch control may be received from either the first OCU 610, the second OCU 660, or an alternative system.

At 704, responsive to the request from the first OCU 610 to switch remote control of the movement of the vehicle system 602 to the second OCU 660, the vehicle control system 624 of the first vehicle 604 terminates remote control of the movement of the vehicle system 602 by the first OCU 610. For example, the vehicle control system 624 may disconnect the communication link 612 between the first vehicle 604 and the first OCU 610.

At 706, responsive to the vehicle control system 624 of the first vehicle 604 terminating the remote control of the vehicle system by the first OCU 610, the second OCU 660 communicates an additional control signal to the vehicle control system 624 of the first vehicle 604 via the control mediation system 626 by the established communication link 662. The additional control signal dictates a change in a movement operational setting of the vehicle system 602. The additional control signal dictated by the second OCU 660 may be uniform or unique from the control signals previously communicated by the first OCU 610. The one or more processors of the control mediation system 626 of the first vehicle 604 one or more of receive, examine, or direct the control signals to the vehicle control system 624 of the first vehicle 604 in order for the vehicle control system 624 to apply the control signals.

Responsive to step 706, the method proceeds to steps 708 and 710. At 708, the vehicle control system 624 of the first vehicle 604 applies the control signals in order to change the movement of the first vehicle 604 and flow of the method returns to 706. For example, the control signals may dictate to increase the throttle notch setting 5. The vehicle control system 624 of the first vehicle 604 directs the propulsion subsystem (of FIG. 2) to change the throttle setting of the first vehicle 604 in order to increase the throttle notch setting to 5.

At 710, the vehicle control system 624 of the first vehicle 604 determines if control signals need to be communicated to the second vehicle 606. If there are no additional control signals for the second vehicle 606, then flow of the method returns to 702. Alternatively, flow of the method returns to 706. At 712, the communication device (of FIG. 2) of the vehicle control system 624 of the first vehicle 604 communicates the control signal to the vehicle control system 624 of the second vehicle 606 in order to remotely control the second vehicle 606 of the vehicle system 602.

At 714, responsive to the vehicle control system 624 of the second vehicle 606 receiving the additional control signal, the vehicle control system 624 of the second vehicle 606 automatically changes the movement of the second vehicle 606, and flow of the method returns to 702.

Figure 8:
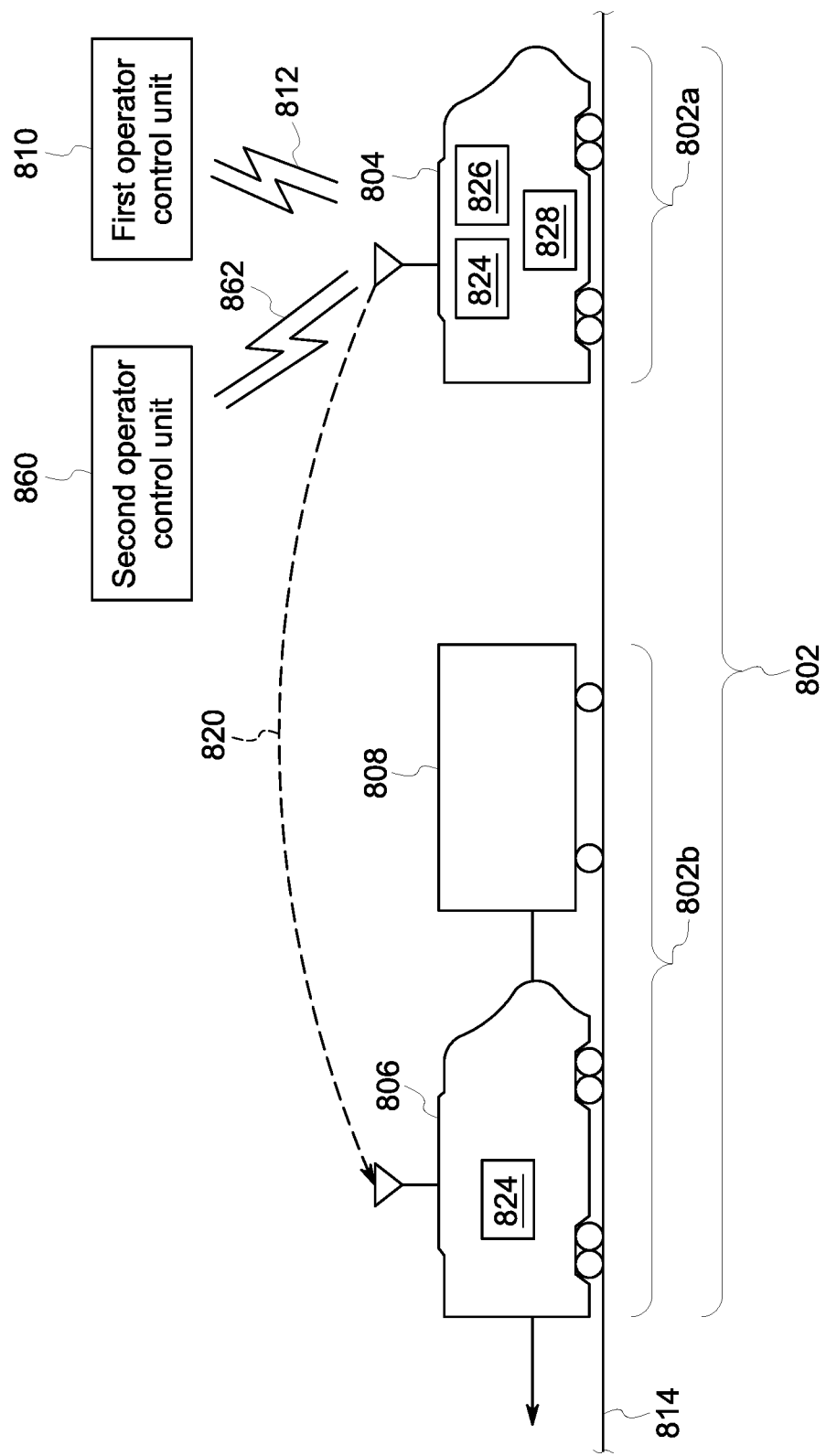
FIG. 8 illustrates a schematic illustration of a system of a vehicle system in accordance with one embodiment.

FIG. 8 illustrates an embodiment of a system 800 of a vehicle system 802 in accordance with one embodiment. The vehicle system 802 includes propulsion generating vehicles 804, 806 (corresponding to the vehicles 104, 106 of FIG. 1) and non-propulsion generating vehicles 808 that travel along a route 814. The vehicle system 802 is separated into two consists 802a, 802b (corresponding to the consists 102a, 102b of FIG. 4). The consist 802a includes at least one propulsion-generating vehicle 804, and the consist 802b includes at least one propulsion generating vehicle 806.

Optionally, one or more propulsion generating vehicles and/or non-propulsion generating vehicles 808 may be included in one or more of the consists 802a, 802b. The lead vehicle 804 includes a control mediation system 826 and speed regulator 828 (corresponding to the control mediation system 126 and speed regulator 128 of FIG. 1). The lead vehicle 804 and the second vehicle 806 include vehicle control systems 824. The lead vehicle 8047 of the consist 802a is communicatively linked to the second vehicle 806 of the consist 802b by the communication link 820. The propulsion-generating vehicles 804, 806 are arranged in a distributed power (DP) arrangement. For example, the first vehicle 804 of the consist 802a issues control signals to the second vehicle 806 of the consist 802b in order to remotely control movement of the second vehicle 806.

The control mediation system 826 is operably connected with a first operator control unit (OCU) 810 that is disposed off-board the vehicle system 802. The first OCU 810 is controlled by an operator off-board the vehicle system 802. Additionally, the control mediation system 826 is also operably connected with a second operator control unit (OCU) 860 that is disposed off-board the vehicle system 802 that is separate from the first OCU 810. The second OCU 860 is controlled by an operator off-board the vehicle system 802. The operators of the first and second OCUs 810, 860 may be the same individual or different.

The first OCU 810 is communicatively linked to the control mediation system 826 of the first vehicle by a communication link 812. Additionally, the second OCU 860 is communicatively linked to the control mediation system 826 by a communication link 862. For example, the vehicle system 802 is communicatively linked to the first OCU 810 and second OCU 860 via the control mediation system 826.

The first and second OCUs 810, 860 communicate control signals to the vehicle system 802 by the communication links 812, 862. The control signals dictate a change in a movement operational setting of the vehicle system 802. The one or more processors of the control mediation system 826 one or more of receives, examines, or directs the control signals to the vehicle control system 824 of the first vehicle 804 and/or the vehicle control system 824 of the second vehicle 806. The control signals may be movement operational settings that include one or more of a throttle notch setting, a brake setting, speed setting, or the like. The control mediation system 826 communicatively links the vehicle control systems 824 with the first and second OCUs 810, 860 in order for the first and second OCUs 810, 860 to remotely control movement of the vehicle system 802.

The control mediation system 826 manages receiving and directing control signals from the first and second OCUs 810, 860 to the appropriate vehicle control systems 824 of one or more of the first or second vehicles 804, 806. For example, the first OCU 810 may use the consist selector 316 (of FIG. 3) in order to select to control movement of the consist 802a. The control mediation system 826 receives the generated control signals from the first OCU 810 by the communication link 812 and directs the control signals to the vehicle control system 824 of the first vehicle 804. Additionally, the second OCU 860 may use the consist selector 316 in order to select to control movement of the consist 802b. The control mediation system 826 receives the generated control signals from the second OCU 860 by the communication link 862 and directs the control signals to the vehicle control system 824 of the second vehicle 806 by the communication link 820. For example, the control mediation system 826 mediates the redirection of the control signals received from the first and second OCUs 810, 860 to the appropriate consist 802a, 802b. Additionally, the control mediation system 826 mediates the redirection of object detection data received from the vehicle control systems 824 of the first and second vehicles 804, 806 to the appropriate first or second OCUs 810, 860. For example, the first OCU 810 may control movement of the consist 802a (e.g., the first vehicle 804) and the second OCU 860 may control movement of the consist 802b (e.g., the second vehicle 806). The control mediation system 826 receives control signals from the first and second OCUs 810, 860. The control mediation system directs the control signals from the first OCU 810 to the vehicle control system 824 of the first vehicle 804. Additionally, the control mediation system 826 prevents control signals from the second OCU 860 from being redirected to the vehicle control system 824 of the first vehicle 804. Similarly, the control mediation system 826 directs control signals from the second OCU 860 to the vehicle control system 824 of the second vehicle 806. Additionally, the control mediation system 826 prevents control signals from the first OCU 810 from being redirected to the vehicle control system 824 of the second vehicle 806.

In one embodiment of the subject matter described herein, a system is provided that includes one or more processors configured to communicatively link a first operator control unit disposed off-board a vehicle system with a vehicle control system disposed onboard the vehicle system. The vehicle system is formed from at least first and second vehicles. The vehicle control system is configured to remotely control movement of the second vehicle from the first vehicle in the vehicle system, wherein the one or more processors also are configured to receive a control signal communicated from the first operator control unit that is disposed off-board the vehicle system to a communication device that is onboard the first vehicle. The control signal dictates a change in movement operational setting of the second vehicle. The one or more processors are also configured to direct the communication device to communicate the control signal from the first vehicle to the second vehicle via the vehicle control system, wherein movement of the second vehicle is automatically changed responsive to communicating the control signal from the communication device onboard the first vehicle to the second vehicle via the vehicle control system.

Optionally, the vehicle control system is a distributed power system. Optionally, the movement operational setting includes one or more of a speed, throttle, or brake setting. Optionally, the first operator control unit is configured to receive image data. The image data is representative of an area ahead of a direction of travel for the vehicle system, wherein an electronic display of the first operator control unit is configured to visually present the image data.

Optionally, the one or more processors are configured to obtain sensor data from an object detection sensor. The sensor data is indicative of a presence of an object ahead of the vehicle system in a direction of travel of the vehicle system. The vehicle control system is configured to prevent the movement of the vehicle system toward the object based on the sensor data regardless of the control signal sent from the first operator control unit.

Optionally, the vehicle control system is configured to receive a request from one or more of the first operator control unit or a second operator control unit to switch remote control of the movement of the vehicle system to the first operator control unit or the second operator control unit. Responsive to receiving the request, the one or more processors are configured to terminate remote control of the movement of the vehicle system by the first operator control unit, and responsive to terminating the remote control of the vehicle system by the first operator control unit, the one or more processors are configured to automatically change the movement of the second vehicle responsive to receiving an additional control signal that is communicated by the second operator control unit to the communication device onboard the first vehicle and from the communication device to the second vehicle.

Optionally, one or more of the first operator control unit or the second operator control unit is configured to be controlled by an operator off-board the vehicle system.

Optionally, the communication device onboard the first vehicle communicates the control signal to the second vehicle via the vehicle control system for automatic control of the movement of the first vehicle and the movement of the second vehicle. The control signal configured to instruct the first vehicle to move in a first direction and instruct the second vehicle to move in a second direction.

In one embodiment of the subject matter described herein, a method is provided that includes communicatively linking a first operator control unit disposed off-board a vehicle system with a vehicle control system disposed onboard the vehicle system. The vehicle system is formed from at least first and second vehicles. The vehicle control system is configured to remotely control movement of the second vehicle from the first vehicle in the vehicle system. The method includes communicating a control signal from the first operator control unit that is off-board the vehicle system to a communication device that is onboard the first vehicle, the control signal dictating a change in a movement operational setting of the second vehicle, and communicating the control signal from the communication device onboard the first vehicle to the second vehicle via the vehicle control system onboard the vehicle system, wherein movement of the second vehicle is automatically changed responsive to communicating the control signal from the communication device onboard the first vehicle to the second vehicle via the vehicle control system.

Optionally, the vehicle control system is a distributed power system. Optionally, the first operator control unit controls movement of the vehicle system. Optionally, the movement operational setting includes one or more of a speed, throttle, or brake setting.

Optionally, the method includes receiving image data at the first operator control unit. The image data is representative of an area ahead of a direction of travel for the vehicle system, and visually presenting the image data on an electronic display of the first operator control unit.

Optionally, the method includes obtaining sensor data from an object detection sensor. The sensor data is indicative of a presence of an object ahead of the vehicle system in a direction of travel of the vehicle system, and preventing the movement of the vehicle system toward the object based on the sensor data regardless of the control signal sent from the first operator control unit.

Optionally, the method includes receiving a request from one or more of the first operator control unit or a second operator control unit to switch remote control of the movement of the vehicle system to the second operator control unit. Responsive to receiving the request, terminating remote control of the movement of the vehicle system by the first operator control unit. Responsive to terminating the remote control of the vehicle system by the first operator control unit, automatically changing the movement of the second vehicle responsive to receiving an additional control signal that is communicated from the second operator control unit to the communication device onboard the first vehicle and from the communication device to the second vehicle.

Optionally, the movement of the first vehicle and the movement of the second vehicle are automatically changed responsive to communicating the control signal from the communication device onboard the first vehicle to the second vehicle via the vehicle control system. The control signal instructing the first vehicle to move in a first direction and instructing the second vehicle to move in a second direction. Optionally, the first vehicle moving in the first direction is disconnected from the second vehicle moving in the second direction.

In one embodiment of the subject matter described herein, a system is provided that includes a communication device configured to be onboard a first vehicle of a vehicle system that also includes a second vehicle. The system includes a controller configured to be disposed onboard the first vehicle for controlling movement of the first vehicle. The controller is configured to receive a control signal from an off-board operator control unit via the communication device. The control signal dictates movement of the vehicle system, wherein the communication device is configured to send the control signal from the operator control unit to the second vehicle.

Optionally, the controller is configured to automatically change the movement of the vehicle system responsive to receiving the control signal from the operator control unit.

Optionally, the communication device is configured to send the control signal from the operator control unit to the second vehicle for automatically controlling the movement of the second vehicle.

Optionally, the controller is configured to automatically move the first vehicle in a first direction responsive to receiving the control signal and the communication device is configured to send the control signal to the second vehicle directing the second vehicle to automatically and concurrently move in a second direction.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain- English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, communication unit, control system, etc) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
   one or more processors configured to communicatively link a first operator control unit disposed off-board a first propulsion-generating vehicle with a communication device disposed onboard the first propulsion-generating vehicle,
   wherein the one or more processors also are configured to receive a first control signal communicated from the first operator control unit that is off-board the first propulsion-generating vehicle to the communication device onboard the first propulsion-generating vehicle, the first control signal dictating a change in a first movement operational setting of the first propulsion-generating vehicle, and
   wherein the one or more processors also are configured to receive a second control signal communicated from the first operator control unit that is off-board the first propulsion-generating vehicle to the communication device onboard the first propulsion-generating vehicle, the one or more processors configured to send the second control signal from the communication device onboard the first propulsion-generating vehicle to a second propulsion-generating vehicle that is separate from the first propulsion-generating vehicle,
   wherein a second movement operational setting of the second propulsion-generating vehicle is automatically changed responsive to communicating the second control signal from the communication device onboard the first propulsion-generating vehicle to the second propulsion-generating vehicle via the communication device onboard the first propulsion-generating vehicle.

2. The system of claim 1, wherein the communication device is included in a distributed power system formed from at least the first propulsion-generating vehicle.

3. The system of claim 1, wherein the first movement operational setting and the second movement operational setting include one or more of a speed, a throttle setting, or a brake setting.

4. The system of claim 1, wherein the first operator control unit is configured to concurrently control different movements of the first propulsion-generating vehicle and the second propulsion-generating vehicle.

5. The system of claim 1, wherein the first operator control unit is configured to receive image data representative of an area ahead of a direction of travel of one or more of the first propulsion-generating vehicle or the second propulsion-generating vehicle, wherein the first operator control unit includes an electronic display configured to visually present the image data.

6. The system of claim 1, wherein the one or more processors are configured to obtain sensor data from an object detection sensor, the sensor data indicative of a presence of an object ahead of at least one of the first propulsion-generating vehicle or the second propulsion-generating vehicle in a direction of travel of the at least one of the first propulsion-generating vehicle or the second propulsion-generating vehicle, and
   wherein the one or more processors are configured to prevent the movement of the at least one of the first propulsion-generating vehicle or the second propulsion-generating vehicle toward the object based on the sensor data.

7. The system of claim 1, wherein the one or more processors are configured to receive a request from one or more of the first operator control unit or a second operator control unit to switch remote control of the second propulsion-generating vehicle from the first operator control unit to the second operator control unit.

8. The system of claim 7, wherein the second operator control unit is configured to be controlled by an operator disposed off-board the first propulsion-generating vehicle and off-board the second propulsion-generating vehicle.

9. The system of claim 1, wherein the one or more processors are configured to automatically control movement of the first propulsion-generating vehicle according to the first movement operational setting,
   wherein the communication device onboard the first propulsion-generating vehicle is configured to communicate the second control signal to the second propulsion-generating vehicle for automatic control of movement of the second propulsion-generating vehicle according to the second movement operational setting, and
   wherein the first control signal is configured to instruct the first propulsion-generating vehicle to move in a first direction and the second control signal is configured to instruct the second propulsion-generating vehicle to concurrently move in an opposite, second direction.

10. A method comprising:
communicatively linking a first operator control unit disposed off-board a first propulsion-generating vehicle with a communication device disposed onboard the first propulsion-generating vehicle;
receiving a first control signal at the communication device onboard the first propulsion-generating vehicle from the first operator control unit that is off-board the first propulsion-generating vehicle, the first control signal dictating a change in a first movement operational setting of the first propulsion-generating vehicle;
receiving a second control signal at the communication device onboard the first propulsion-generating vehicle from the first operator control unit that is off-board the first propulsion-generating vehicle, the second control signal dictating a change in a second movement operational setting of a second propulsion-generating vehicle that is separate from the first propulsion-generating vehicle; and
communicating the second control signal from the communication device onboard the first propulsion-generating vehicle to the second propulsion-generating vehicle,
wherein movement of the second propulsion-generating vehicle is automatically changed responsive to communicating the second control signal from the communication device onboard the first propulsion-generating vehicle to the second propulsion-generating vehicle.

11. The method of claim 10, wherein the communication device is included in a distributed power system formed from at least the first propulsion-generating vehicle.

12. The method of claim 10, wherein the first control signal and the second control signal concurrently control movements of both the first propulsion-generating vehicle and the second propulsion-generating vehicle.

13. The method of claim 10, wherein the first movement operational setting and the second movement operational setting include one or more of a speed, a throttle setting, or a brake setting.

14. The method of claim 10, further comprising:
receiving image data at the first operator control unit, the image data representative of an area ahead of a direction of travel of one or more of the first propulsion-generating vehicle or the second propulsion-generating vehicle; and
visually presenting the image data on an electronic display of the first operator control unit.

15. The method of claim 10, further comprising:
obtaining sensor data from an object detection sensor, the sensor data indicative of a presence of an object ahead of one or more of the first propulsion-generating vehicle or the second propulsion-generating vehicle in a direction of travel of the one or more of the first propulsion-generating vehicle, and or the second propulsion-generating vehicle; and
preventing the movement of the one or more of the first propulsion-generating vehicle or the second propulsion-generating vehicle toward the object based on the sensor data.

16. The method of claim 10, further comprising:
receiving a request from one or more of the first operator control unit or a second operator control unit to switch remote control of the movement of the second propulsion-generating vehicle from the first operator control unit to the second operator control unit.

17. The method of claim 10, wherein the movement of the first propulsion-generating vehicle and the movement of the second propulsion-generating vehicle are automatically changed responsive to receiving the first control signal at the communication device onboard the first propulsion-generating vehicle and communicating the second control signal from the communication device to the second propulsion-generating vehicle, the first control signal instructing the first propulsion-generating vehicle to move in a first direction and the second control signal instructing the second propulsion-generating vehicle to move in an opposite, second direction.

18. The method of claim 10, wherein the first propulsion-generating vehicle is disconnected from the second propulsion-generating vehicle.

19. A system comprising:
a communication device configured to be onboard a first propulsion-generating vehicle, the communication device configured to receive control signals from a control unit disposed off-board the first propulsion-generating vehicle; and
a controller configured to be disposed onboard the first propulsion-generating vehicle and to control movement of the first propulsion-generating vehicle according to a first control signal of the control signals received by the communication device from the control unit, the controller configured to receive a second control signal of the control signals received by the communication device from the control unit,
wherein the communication device is configured to send the second control signal from the control unit to a second propulsion-generating vehicle that is disconnected from the first propulsion-generating vehicle for controlling movement of the second propulsion-generating vehicle.

20. The system of claim 19, wherein the controller is configured to automatically change the movement of the second propulsion-generating vehicle responsive to receiving the second control signal from the control unit.

21. The system of claim 19, wherein the communication device is configured to send the second control signal from the control unit to the second propulsion-generating vehicle for automatically controlling the movement of the second propulsion-generating vehicle.

22. The system of claim 19, wherein the controller is configured to automatically move the first propulsion-generating vehicle in a first direction responsive to receiving the first control signal and the communication device is configured to send the second control signal to the second propulsion-generating vehicle for directing the second propulsion-generating vehicle to automatically and concurrently move in an opposite, second direction while the first propulsion-generating vehicle moves in the first direction.

* * * * *